Aug. 3, 1971     C. DAVIDOFF     3,597,177
METHOD OF PRODUCING GLASS BEADS
Filed July 19, 1968
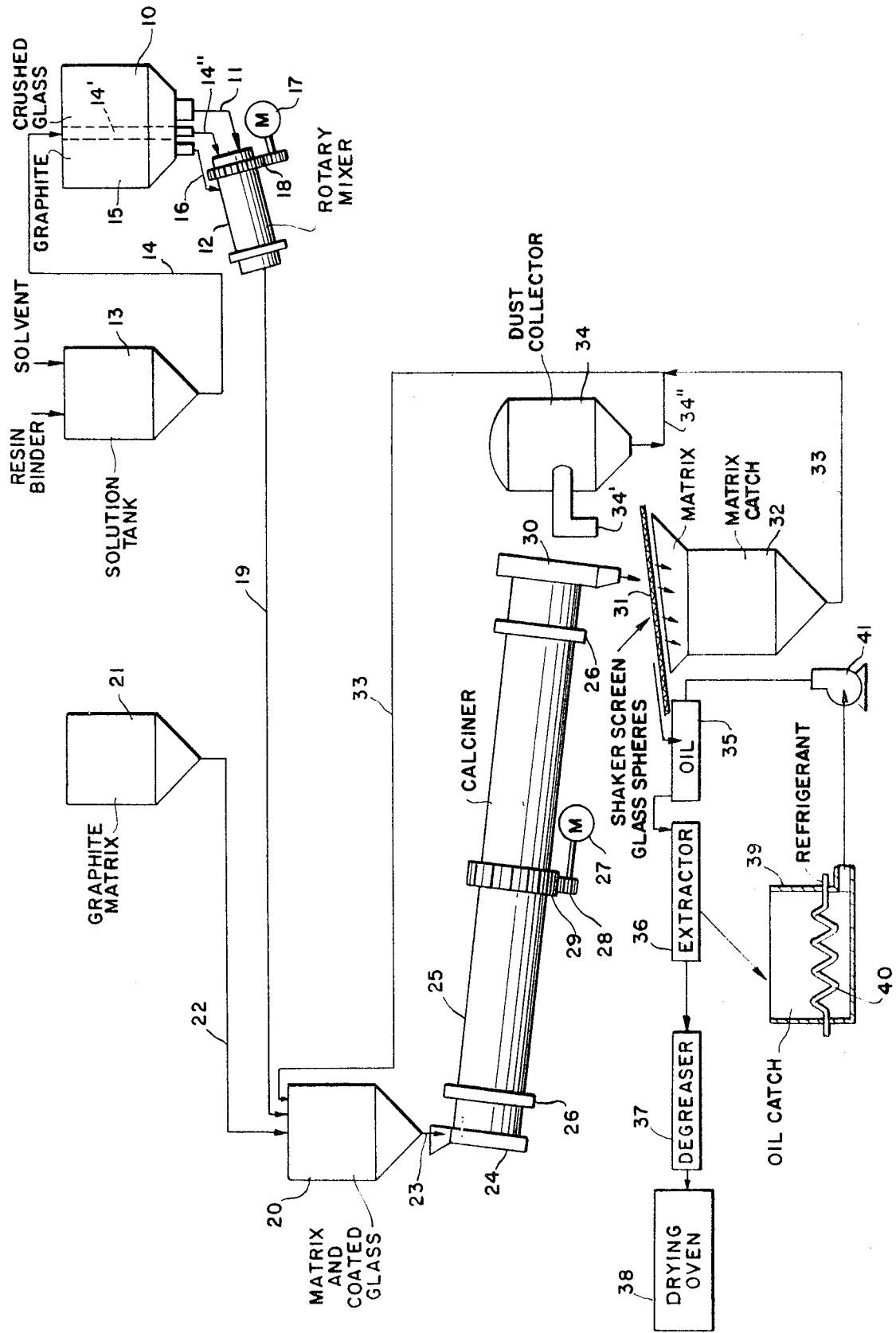

United States Patent Office 3,597,177
Patented Aug. 3, 1971

3,597,177
METHOD OF PRODUCING GLASS BEADS
Charles Davidoff, Manhasset, N.Y., assignor to
Potters Bros., Inc., Carlstadt, N.J.
Filed July 19, 1968, Ser. No. 746,133
Int. Cl. C03b 19/10
U.S. Cl. 65—21                                    19 Claims

ABSTRACT OF THE DISCLOSURE

A method of producing glass spheres or beads from crushed glass. The method involves applying a resin binder to the surfaces of the glass particles and then applying a coating of a finely divided susbtance, such as graphite. The thus coated particles are dried and are intermixed with a matrix which has approximately the same specific gravity as the glass and is present in about the same quantity by weight. The intermixture of coated glass and matrix is then subjected to externally applied heat while the mixture is being conveyed through an elongated rotary calciner. The calciner is effective to raise the mixture to a temperature which preferably is below the ignition point of the matrix but above the softening point of the glass. The mixture is maintained at the selected temperature for a sufficient period of time to cause the glass to soften to such an extent that its surface tension, aided by the rolling motion of the calciner, converts the particles into spherical form. After such spheroidization of the glass has been achieved, the mixture is discharged onto a shaker screen of suitable mesh, adapted to retain the glass spheres on its upper surface but to permit the matrix to pass through its openings into a catch basin. This enables reuse of the matrix with another quantity of coated glass, and it serves to raise the temperature of the latter to a substantial extent before it is introduced into the calciner. When it is desired to stress the glass spheres to obtain beads of greater strength, the spheres are delivered from the shaker screen to an oil bath where they are quenched. If desired, the spheres may then be separated from the oil and dried to a condition ready for shipment or storage. Most of the oil used in the quenching step is recovered and cooled for reuse in the process.

This invention relates to the production of glass beads from crushed glass particles.

The glass beads produced in accordance with the present invention are of high strength and are adapted for a variety of different uses. These include, for example, their use as an excellent proppant in oil wells, as shot peening media, in peen plating of metals, as a paint grinding medium, as a finishing or cleaning material in rotating barrels or vibratory finishing machines, as an insulating medium and as battery spacers. The beads may also be employed in the manufacture of reflecting signs and markers and in reflecting divider lines or the like applied to the surfaces of roads. For certain purposes a substantial difference in the diameter of the beads is permissible. For other uses it is rather important that they have a diameter falling within predetermined limits. The present invention enables the ready production of glass beads for all of these and a variety of other uses to which such beads have been put in the past or may be put in the future. An important advantage of the invention is that it enables the production of beads of the desired character on an efficient and economical basis.

Briefly stated, the invention involves the delivery of three separate components into a rotary mixer. These components include, firstly, crushed glass particles, secondly, a binder, and thirdly, a coating substance, such as graphite, which is adhered to the glass by the binder and which insures that the individual pieces of glass remain separated from each other to thereby prevent agglomeration. Although a wide variety of binders may be employed, particularly good results are obtained through the use of a resin such as paracoumarone-indene resin dissolved in a volatile solvent such as toluene. Paracoumarone-indene resin is available commercially from the Barrett Chemical Division of Allied Chemical Corp. under the trade name "Cumar" and is referred to herein as Cumar resin.

From the mixer, the coated particles of glass are delivered to a receptacle which also has delivered thereto a suitable matrix. The matrix illustratively comprises a mixture of magnesium oxide and graphite. The delivery of the various components into the receptacle is so carried out as to bring about a good intermixture between the matrix and the coated glass particles. This intermixture is then delivered to a rotating calciner. The calciner is heated to a temperature sufficient to raise the temperature of the mixture, to a point at which the glass particles will soften to such an extent that they are converted into spherical form as they pass from one end to the other of the calciner.

An important feature of the heat treatment within the rotating calciner is that none of the components of the matrix is lost. Upon reaching the dischare end of the calciner, the material is deposited onto a shaker screen which serves to separate the glass spheres that have been formed from the matrix. The latter is discharged from the screen into a container from which it is returned to the receptacle in which the matrix and other components are originally brought together. As a result of this procedure, there are at least two advantages. In the first place, the need for supplying more than a small amount of fresh matrix to the mixture in the receptacle is eliminated; and in the second place, a substantial amount of heat is conveyed to the receptacle so that the mixture delivered to the calciner is preheated.

In a preferred form of the apparatus, the glass spheres that are deposited on the shaker screen are delivered by gravity from the top of the latter to a container in which a certain amount of oil is supplied to quench the spheres. The mixture of glass spheres and oil is delivered to an extractor which serves to remove the oil and deliver it to a receptacle in which it is preferably cooled and then recycled for further use. If desired, the glass spheres may be discharged from the extractor along a different path to a degreaser and then to a drying oven.

With the foregoing features and advantages of the invention in mind, a preferred apparatus and mode of operation will now be described in further detail by reference to the accompanying drawing, which is a diagrammatic or schematic view of the equipment described above for carrying out the process.

Turning now to the drawing, the apparatus or system for carrying out a preferred embodiment of the invention involves a storage bin 10 for the crushed glass particles. This glass may be screened, if desired, to limit it to a particular size range, or it may be treated in accordance with the process to create glass spheres of variable sizes, which may then be screened, if desired, to provide beads of a particular size range. From the bottom of the bin 10, the crushed glass is continuously fed in any suitable way, as by gravity, through a channel or conduit 11 into a heated rotary mixer 12 which is disposed at a suitable angle to the horizontal. A solution tank 13 is provided adjacent the mixer 12 and is supplied with Cumar resin and toluene, the latter creating a Cumar solution, preferably about 4% by weight of resin. This solution is delivered through a line 14 and channels 14' and 14'' to the mixer 12. The solution provides the outer surfaces of the crushed particles with a binding agent which is adapted to bring about adherence of a suitable powered material to the surfaces of the particles.

In the embodiment of the invention illustrated, the powdered material is graphite which is preferably in a very fine powdery form. The graphite is fed, by gravity or by other means, from a bin 15 through a line or channel 16 to a point within the rotary mixer 12 which is at some distance toward the left, as shown in the drawing, from the end at which the crushed glass and Cumar solution are introduced into the mixer. This insures application of the Cumar solution to the surfaces of the glass before the graphite comes in contact with those surfaces, thereby providing proper binding of the graphite to the glass. The mixer is rotated at a suitable speed by a motor 17 through gearing 18. It will be understood that the mixer is suitably mounted in bearings to enable its ready rotation about the inclined axis shown and mentioned above. The mixer preferably is heated to a temperature sufficient to continouusly drive off the toluene vapors, such that the graphite coated particles are discharged in a fully dried condition.

From the lower end of the heated rotary mixer, the crushed glass particles, having the graphite quite uniformly coated over their outer surfaces, are delivered through a conduit or channel 19 to a hopper 20. This may be accomplished by a suitable conveyor or by gravity if the mixer is above the hopper 20. In the hopper the coated particles are intermixed with a matrix which is preferably composed of a mixture of magnesium oxide and graphite. A mixture of these two substances in a one-to-one weight ratio is preferred but not essential. It has been found desirable to use equal amounts by weight of matrix and coated glass, although some variation in their relative amounts may be employed. Also, other ingredients may be used, such as matrices of ferric oxide, silica or titanium dioxide, either in lieu of or in combination with those mentioned. An important consideration is that the specific gravity of the matrix should be approximately the same as that of the glass, thus enabling a random distribution of the individual glass particles within the matrix. It is also desirable that the matrix exhibit a degree of heat conductivity sufficient to provide a uniform temperature distribution through the mass within a reasonable time and that it retain its physical and chemical properties throughout the reaction period and after repeated reuse. For economy it is desirable to have the matrix of such character that it does not wet the glass at the temperatures employed, such that it may be readily separated from the glass and reused.

From the lower end of the hopper 20, the mixture of matrix and coated glass is delivered through a conduit 23 to a stationary head 24 at the upper end of a rotating calciner 25. The calciner 25 is of conventional construction and is mounted in suitable bearing means 26 to enable its rotation and to maintain it at an inclination that insures the movement of the contents by gravity from the upper toward the lower end. Such inclination may be between about ⅛ and ½ inch per horizontal foot. A motor 27 is adapted to rotate the calciner through gearing 28 and 29 at an appropriate speed which may be between about 4 and 13 r.p.m. If desired, spirally arranged flights (not visible in the drawing) may extend inwardly from the cylindrical wall of the calciner to assist in advancing the mixture toward a head 30 at the lower end. The heads 24 and 30 serve to substantially enclose the calciner and thus enable the provision of a controlled atmosphere therein.

The rotary calciner 25 is of the gas-fired type. The calciner is heated to a temperature sufficient to raise the temperature of the mixture of matrix and coated glass particles to the point required to render the glass sufficiently soft to enable surface tension forces to convert each piece of glass into a sphere. It is desirable to retain the mixture being treated at a temperature of between 1400° F. and 1750° F. for a period of ten to forty-five minutes, depending upon the size of the particles and the characteristics of the glass and of the matrix. The maximum temperature to which the mixture is heated advantageously is below the ignition point of the matrix, so that the matrix may be readily reused. For example, in cases in which a graphite matrix is used the maximum temperature preferably is less than graphite's ignition point of 1640° F. The calciner should be of such size and length to maintain the mixture at this temperature.

The mixture of matrix and coated glass spheres is continuously discharged from the rotating calciner 25 onto a shaker screen 31. The screen 31 may be of any suitable construction adapted to insure the separation of the glass spheres from the matrix. The relatively fine matrix passes through the screen 31 and is discharged into a catch basin 32. From the basin 32 the recovered matrix is delivered through a channel 33, by any suitable means, and returned to the top of the hopper 20. The operation of the shaker screen also releases some of the matrix in the form of dust, and this is collected by a dust collector 34. The collector 34 produces a suction action at its inlet 34'. The dust particles of matrix thus retrieved by the collector are delivered through a conduit 34'' to the channel 33 and are returned along with the major portion of the matrix to the hopper 20.

The glass spheres which remain on the upper surface of the shaker screen 31 may be discharged by gravity from the latter into a suitable storage hopper (not shown). In certain preferred embodiments, however, the spheres are sent through a quenching cycle. A container 35 carrying a suitable oil serves to quench the spheres, if so desired, in order to stress the spheres for greater strength. For best results, the temperature of the spheres as they contact the oil preferably should be at least about 1250° F. From the container 35 the quenched spheres, along with some of the oil, are continuously discharged into an extractor 36 which serves to separate the spheres from the oil. This extractor may be of a centrifugal type. If further oil removal is desired, the spheres are then passed to a degreaser 37. The degreaser assists in removing any residual oil which has not been separated from the beads by the extractor 36. Finally, the spheres are delivered to a drying oven 38 for the removal of the entrained degreasing solvents.

The quenching oil in the extractor 36 is discharged into a catch basin 39 where the oil is cooled. To assist in this cooling action, the basin 39 preferably is provided with a cooling coil 40 through which a suitable coolant is circulated. The cooled oil is then withdrawn from the basin 39 by a pump 41 and is recirculated into the container 35.

As a result of various tests that have been made, it has been found desirable in several preferred embodiments to use substantially equal quantities by weight of the coated crushed glass and of the matrix. These components should be supplied to and withdrawn from the rotating calciner at a constant rate. Also, the liquid binder used to cause the graphite in the mixer to adhere properly to the crushed glass preferably should be about 4 percent by weight of Cumar resin in toluene. This solution is mixed with the glass in the ratio of about 5 parts by weight of solution to 100 parts by weight of glass. The quantity of graphite necessary to sufficiently coat the glass particles need be only between about 2 percent of the weight of the glass. It will be understood that certain variations in these proportions can be made, but the preferred operating conditions appear to involve substantially the proportions mentioned.

With respect to the graphite employed, the materials that have been tested include three different types, these being (a) natural crystalline, (b) artificial amorphous, and (c) natural amorphous. The tests indicate that all three types are satisfactory, but that the amorphous types are better suited for the purpose.

Although the Cumar in toluene solution has been found from various tests to be the preferred substance for adhering the graphite to the crushed glass particles, various other binders have been tested and found to be reasonably satisfactory. The tested binders which have exhibited particularly good results include binders of natural gums such as shellac and gum sandarac, binders of water soluble resins such as sodium carboxy methyl-cellulose and polyvinyl alcohol, and binders from the families of acrylic resins, epoxy resins, polyurethane resins, alkyd resins and vinyl resins. The natural gums are dissolved in alcohol or in water containing borax, the sodium carboxy methylcellulose and the polyvinyl alcohol are dissolved in water, the acrylic, epoxy and vinyl resins are dissolved in acetone, with a hardener added for the epoxies, and the polyurethane and alkyd resins are dissolved in toluene. The preferred solution has been found to be a 4 percent solution, but higher percentages of up to 8 percent also have been found to be suitable. The concentration should be such as to make the solution a good agent for binding the graphite onto the glass but should be sufficiently low to avoid agglomeration of the glass particles.

Various tests were conducted with finely powdered substances other than graphite for coating the glass particles. In these tests 25 grams of glass were treated with 2 milliliters of 4 percent Cumar in toluene solution and then with 0.5 gram of one or another of various oxides. The oxides which appear to give reasonably good results are zirconium oxide, manganese dioxide, molybdenum trioxide, cupric oxide and silicon dioxide. Further tests indicated that, if a second coating of graphite was applied to the oxide coating of one or another of the various types tested alone, some improvement in the results was obtained. For example, arsenic oxide applied as a first coating and then followed by a graphite coating produced quite good results. Also, the manganese dioxide coating when covered by a coating of graphite was found to produce improved results. For simplicity, it appears preferable to employ a single coating of a suitable type, but in some cases the multiple coatings exhibit distinct advantages.

There are various other factors to be considered in carrying out the invention. For example, the temperature to which the coated crushed glass is subjected will affect the percentage of the glass that will be converted into spheres within a given time interval. At lower temperatures, say, 1400° F., a longer time interval is naturally required for the passage of the glass particles through the rotary calciner to insure spheroidization of a high percentage of the particles. At a higher temperature, i.e., in the neighborhood of 1700° F., a shorter time interval will be found effective to produce the desired result.

The foregoing operations and resulting observations are based largely upon laboratory tests which were naturally conducted on a small scale basis. Further tests were conducted on a considerably larger scale. In one such operation crushed glass particles having a size range of 14–18 mesh U.S. Standard were used as the raw material. The particles were coated in a large stainless steel barrel or drum having its longitudinal axis inclined at about a forty-five degree angle to the horizontal. Fifty pounds of the crushed glass were put into the drum, and the latter was rotated at about 25 r.p.m. A 4 percent solution of Cumar resin in toluene was added to the drum at a ratio of 31.8 milliliters per pound of broken glass. This resin solution was mixed with the glass particles for a period of five minutes to insure the total wetting of all of the surfaces of the particles. Graphite powder, in the form of Grade 38 obtained from the National Carbon Company, was then introduced into the drum. The quantity of the introduced powder was in the ratio of 9 grams per pound of glass. The drum was rotated until a uniform graphite distribution on the resin wetted glass was obtained, and heat was then applied from an external gas burner to drive off the toluene and to dry the batch of graphite coated glass particles. Upon examination of the glass at this time, each particle had a firm coating of graphite, and there was little, if any, agglomeration of the glass.

Two batches of the foregoing type were prepared and used in conjunction with matrices of two different types. Each matrix was composed of 50 percent by weight of the Grade 38 graphite mentioned above. One of these matrices had its other 50 percent composed of U.S.P. Grade magnesium oxide, a refined grade, while the second matrix had its other 50 percent portion composed of F.M.C. Corporation's No. 2665, Double-Mill magnesium oxide, a Technical Grade. It will be appreciated that the first-mentioned magnesium oxide is much more expensive than the second-mentioned type. Each matrix was prepared by tumble mixing in the inclined stainless steel drum referred to above.

The coated particles and the successive matrices mentioned above were quite thoroughly intermixed in 100-pound quantities, each containing 50 pounds of particles and 50 pounds of matrix. The resulting intermixture was then fed into the calciner through the use of a rotating screw in sucessive test runs. The calciner included a tube of stainless steel which was 6½ inches in diameter and 11 feet long. The tube was heated externally by gas burners to create four temperature zones which were equally spaced along the length of the tube. The finished material left the lower and of the calciner through a material discharge outlet and was dropped into a container. This discharge included both the spheroidized glass and the matrix. These two ingredients were then separated by screening.

In the first of the test runs, a mixture of the U.S.P. Grade magnesium oxide matrix and the coated crushed glass particles was fed to the calciner tube at a rate of 125 grams per minute. The tube was set at a slop of ⅛ inch per foot and was rotated at 6.6 r.p.m. With these parameters, the total time of the mixture in the calciner was 39.2 minutes. The time in the third and fourth temperature zones for this run was 21.4 minutes. The run was divided into four parts during which the mixture was maintained at successively higher temperatures in accordance with the following table:

| Part No. | Zone temperatures in degrees F. | | | | Mixture temperature |
|---|---|---|---|---|---|
| | Zone No. 1 | Zone No. 2 | Zone No. 3 | Zone No. 4 | |
| I | 1,430–1,550 | 1,510–1,580 | 1,500–1,580 | 1,520–1,580 | 1,530–1,580 |
| II | 1,490–1,510 | 1,570–1,600 | 1,570–1,600 | 1,580–1,600 | 1,580–1,600 |
| III | 1,500–1,520 | 1,600–1,610 | 1,600–1,610 | 1,600–1,630 | 1,600–1,640 |
| IV | 1,510–1,520 | 1,620–1,630 | 1,620 | 1,630 | 1,640 |

The glass used during the run ranged in size from 14–18 mesh U.S. Standard. Upon being discharged from the calciner, the glass spheres were separated from the matrix and were carefully examined under a microscope in accordance with standard sphere testing procedures and were found to be satisfactory. The percentage of spheres obtained during the various parts of the run were as follows:

Run No. 1:                           Percent spheres
    Part I _____ 87
    Part II _____ 87
    Part III _____ 100
    Part IV _____ 96

In a second run, the procedure was similar to that described above, but the mixture was fed into the calciner at a rate of 175 grams per minute, and the speed was increased to 9 r.p.m. The overall retention time in the calciner was 27 minutes, while the residence time in the third and fourth zones was 15 minutes. The run was divided into six successive parts. The first four parts continued to use the matrix with the U.S.P. Grade magnesium oxide, while the last two parts used the matrix with the Technical Grade magnesium ovide. The temperatures of the mixture during the various parts of the run were as follows:

| Part No. | Zone temperatures in degrees F. | | | | Mixture temperature |
| --- | --- | --- | --- | --- | --- |
| | Zone No. 1 | Zone No. 2 | Zone No. 3 | Zone No. 4 | |
| I | 1,300–1,500 | 1,450–1,570 | 1,390–1,570 | 1,500–1,580 | 1,500–1,600 |
| II | 1,300–1,340 | 1,440–1,480 | 1,510–1,580 | 1,560–1,590 | 1,560–1,620 |
| III | 1,270–1,320 | 1,390–1,560 | 1,540–1,610 | 1,540–1,610 | 1,540–1,610 |
| IV | 1,340–1,400 | 1,510–1,540 | 1,620 | 1,620–1,630 | 1,610–1,630 |
| V | 1,380–1,410 | 1,440–1,540 | 1,590–1,620 | 1,590–1,670 | 1,620–1,630 |
| VI | 1,310 | 1,470 | 1,580 | 1,580 | 1,580–1,590 |

The percentage of spheres that were produced during the second run was approximately in accordance with that indicated above with respect to Run No. 1.

Upon quenching the spheres produced during the foregoing test runs, the spheres exhibited a marked increase in strength and resistance to deformation at high pressures. The quenching was accomplished by heating the spheres to a temperature of 1250° F. and then immersing the spheres in a bath of SAE–20 motor oil. During the normal continuous carrying out of the various steps to produce the spheres, the quenching step may be applied after the spheres have passed through the calciner and prior to their cooling to a temperature below the annealing temperature of the glass.

One advantage of the use of a rotating calciner for producing the spheres is that the calciner is indirectly fired. As a result, the products of combustion are kept separate from the products of reaction within the tube, and the graphite or other matrix material may be readily recirculated through the system. In some embodiments of the invention, however, particularly in cases in which the matrix is not recirculated, a rotary kiln or other directly-fired inclined tube may be employed with good effect.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. A method of making glass spheres which comprises mixing crushed glass particles with a resin binder to coat the particles, applying to the particles a finely divided coating substance which will prevent the particles from agglomerating at the softening point of the glass, to provide a thin coating of said substance bonded to the resin coated surfaces of the glass particles, intermixing said coated glass particles with a finely divided matrix having substantially the same specific gravity as said particles, subjecting the mixture of coated glass particles and matrix to motion sufficient to agitate the mixture, subjecting the mixture to externally applied heat to increase the temperature of said mixture to between 1400° F. and 1750° F. and maintaining the mixture at such an elevated temperature for a time sufficient to cause the glass particles to soften and enable the surface tension thereof to convert the particles into spheres, and then separating the glass spheres from the matrix.

2. A method of making glass spheres as set forth in claim 1, in which said matrix consists of one or more compounds selected from the group of graphite, magnesium oxide, ferric oxide, silica and titanium dioxide.

3. A method of making spheres as set forth in claim 1 in which said matrix consists of a composition selected from the group of magnesium oxide, ferric oxide, silicon dioxide, and titanium dioxide, alone or in combination with graphite.

4. A method of making glass spheres as set forth in claim 1 in which said coating is graphite and said binder is about a 4% solution of paracoumarone-indene resin in toluene.

5. A method of making glass spheres as set forth in claim 1 in which said matrix substantially consists of approximately equal parts by weight of magnesium oxide and graphite.

6. A method of making glass spheres as set forth in claim 1 in which the mixture of coated glass particles and matrix is delivered to a revolving cylinder in which said mixture is subjected to indirect heat applied to the outer surface of said cylinder.

7. In a method as set forth in claim 6, said cylinder being disposed with its longitudinal axis at an inclination of between about ⅛ and ½ inch per horizontal foot, said mixture being delivered to said cylinder adjacent its upper end.

8. In a method as set forth in claim 7, said cylinder being rotated at a speed of between 4 and 13 r.p.m.

9. A method of making glass spheres as set forth in claim 1 in which the separation of the glass spheres from the matrix is effected by depositing the mixture onto a vibrating shaker screen having openings therethrough of such size as to prevent the passage of the spheres therethrough but permit the matrix to pass therethrough.

10. In a method as set forth in claim 9, the steps of collecting dust dispersed by the vibration of the shaker screen, and delivering such dust to the mixture of glass particles and matrix to be subsequently introduced into said cylinder.

11. A method as set forth in claim 10, in which said glass spheres while at a temperature of about 1250° F. or more are quenched by the interengagement thereof with a liquid which has a substantially lower temperature.

12. A method as set forth in claim 11, in which said liquid is oil.

13. A method as set forth in claim 12, in which said quenching of the glass spheres is effected by discharging them upon separation from the matrix directly into a relatively cold body of oil.

14. A method as set forth in claim 13, in which the glass spheres are separated from the quenching oil, and the oil is then cooled and returned for the quenching of further glass spheres.

15. A method of making glass spheres which comprises mixing crushed glass particles with a resin binder to coat the particles, applying to the particles a finely divided coating substance which will prevent the particles from agglomerating at the softening point of the glass, to provide a thin coating of said substance bonded to the resin coated surfaces of the glass particles, intermixing said coated glass particles with a finely divided matrix, subjecting the mixture of coated glass particles and matrix to motion sufficient to agitate the mixture, heating the mixture of coated glass particles and matrix to a temperature in excess of 1400° F. but below the ignition point of the matrix, maintaining the mixture at such an elevated temperature for a time sufficient to cause the glass particles to soften and enable the surface tension thereof to convert the particles into spheres, and then separating the glass spheres from the matrix.

16. A method of making glass spheres as set forth in claim 15 in which the matrix after separation from the glass spheres is cycled for intermixing with another body of coated glass particles prior to subjecting the latter to said externally applied heat.

17. A method of making glass spheres which comprises mixing crushed glass particles with a resin binder to coat the particles, applying to the particles a finely divided substance selected from the group of graphite, silicon dioxide, zirconium oxide, manganese dioxide, molybdenum trioxide and cupric oxide, to provide a thin coating of said substance bonded to the resin coated surfaces of the glass particles, intermixing said coated glass particles with a finely divided matrix, subjecting the mixture of coated glass particles and matrix to motion sufficient to agitate the mixture, heating the mixture of coated glass particles and matrix to a temperature in excess of 1400° F. but below the ignition point of the matrix, maintaining the mixture at such an elevated temperature for a time sufficient to cause the glass particles to soften and enable the surface tension thereof to convert the particles into spheres, and then separating the glass spheres from the matrix.

18. A method of making glass spheres which comprises mixing crushed glass particles with a resin binder selected from the group of paracoumarone-indene resin, natural gum resins, water soluble resins, acrylic resins, epoxy resins, polyurethane resins, alkyd resins and vinyl resins, to coat the particles with the resin binder, applying to the particles a finely divided substance selected from the group of graphite, silicon dioxide, zirconium oxide, manganese dioxide, molybdenum trioxide and cupric oxide, to provide a thin coating of said substance bonded to the resin coated surfaces of the glass particles, intermixing said coated glass particles with a finely divided matrix, subjecting the mixture of coated glass particles and matrix to motion sufficient to agitate the mixture, heating the mixture of coated glass particles and matrix to a temperature in excess of 1400° F. but below the ignition point of the matrix, maintaining the mixture at such an elevated temperature for a time sufficient to cause the glass particles to soften and enable the surface tension thereof to convert the particles into spheres, and then separating the glass spheres from the matrix.

19. A method of making glass spheres which comprises mixing crushed glass particles with a binder selected from the group of paracoumarone-indene resin, natural gum resins, water soluble resins, acrylic resins, epoxy resins, polyurethane resins, alkyd resins and vinyl resins to coat the particles with the resin binder, and then applying to the particles a finely divided substance selected from the group of graphite, silicon dioxide, zirconium oxide, manganese dioxide, molybdenum trioxide and cupric oxide, to provide a thin coating of said substance bonded to the resin coated surfaces of the glass particles, intermixing said coated glass particles with a finely divided matrix having substantially the same specific gravity as said particles, subjecting the mixture of coated glass particles and matrix to motion sufficient to agitate the mixture, subjecting the mixture to externally applied heat to increase the temperature of said mixture to between 1400° F. and 1750° F. and maintaining the mixture at such an elevated temperature for a time sufficient to cause the glass particles to soften and enable the surface tension thereof to convert the particles into spheres, and then separating the glass spheres from the matrix.

References Cited

UNITED STATES PATENTS

| | | | |
|---|---|---|---|
| 2,460,977 | 2/1949 | Davis et al. | 65—21 |
| 2,461,011 | 2/1949 | Taylor et al. | 65—21 |
| 2,713,286 | 7/1955 | Taylor | 65—21X |
| 3,250,603 | 5/1966 | Schott | 65—21 |

S. LEON BASHORE, Primary Examiner

R. L. LINDSAY, Jr., Assistant Examiner

U.S. Cl. X.R.

65—60; 117—123